United States Patent [19]
Noé

[11] Patent Number: 5,381,342
[45] Date of Patent: Jan. 10, 1995

[54] SYSTEM FOR TRIMMING A CONTINUOUSLY MOVING METAL STRIP

[75] Inventor: Oskar Noé, Müheim/Ruhr, Germany

[73] Assignee: BWG Bergwerk- und Walzwerk-Maschinenbau GmbH, Duisburg, Germany

[21] Appl. No.: 9,461

[22] Filed: Jan. 27, 1993

[30] Foreign Application Priority Data

Feb. 15, 1992 [DE] Germany .................... 4204526

[51] Int. Cl.⁶ .................................... G01B 11/02
[52] U.S. Cl. ........................ 364/474.34; 364/472; 364/469; 364/474.09; 83/72; 72/11
[58] Field of Search ......... 364/472, 469, 468, 474.05, 364/474.09, 474.34; 72/11, 12, 10, 9, 332; 29/4.53, DIG. 26; 83/72, 73, 74, 75, 75.5, 246, 286, 303, 471.1, 425.1, 425.2, 407

[56] References Cited

U.S. PATENT DOCUMENTS

| | | | |
|---|---|---|---|
| 3,890,862 | 6/1975 | Lhenry ....................... | 83/71 |
| 4,248,072 | 2/1981 | Hasegawa et al. ........ | 364/472 X |
| 4,497,192 | 2/1985 | Reizig et al. ............. | 72/203 |
| 4,527,243 | 7/1985 | Loose ......................... | 72/11 X |
| 4,607,552 | 8/1986 | Siler ........................... | 83/71 |
| 4,747,063 | 5/1988 | Kuramoto ................. | 364/474.09 X |
| 4,839,816 | 6/1989 | Cattrall et al. ........... | 364/474.09 |
| 4,977,805 | 12/1990 | Corley, III ................ | 364/474.09 X |
| 5,007,318 | 4/1991 | Cox et al. .................. | 83/425.2 |

FOREIGN PATENT DOCUMENTS 21821 1/1980 European Pat. Off. .

*Primary Examiner*—Roy N. Envall, Jr.
*Assistant Examiner*—Brian C. Oakes
*Attorney, Agent, or Firm*—Herbert Dubno; Andrew Wilford

[57] ABSTRACT

A strip is displaced longitudinally with its edges parallel to a stationary machine centerline at a predetermined travel speed through a monitoring station and through a trimming station spaced downstream from the monitoring station and equipped with a pair of transversely offset trimming heads. The transverse offset of the strip edges relative to the machine centerline is continuously monitored at the monitoring station and respective outputs corresponding to the transverse offsets between the respective edges and the machine centerline at the monitoring station are produced. The time the strip takes to travel from the monitoring station to the trimming station is calculated based on the strip travel speed and the longitudinal spacing between the stations. The trimming heads are transversely displaced in accordance with the calculated time and the respective transverse edge offset such that the heads remain in contact with the strip. Continuous edge portions are thus cut from the strip with the heads.

10 Claims, 4 Drawing Sheets

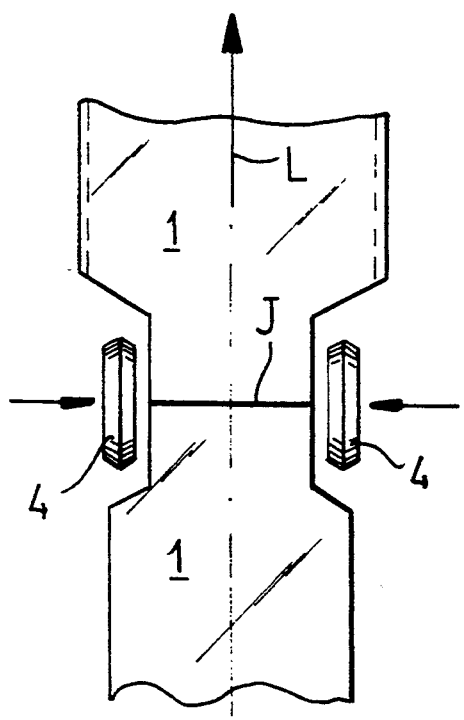
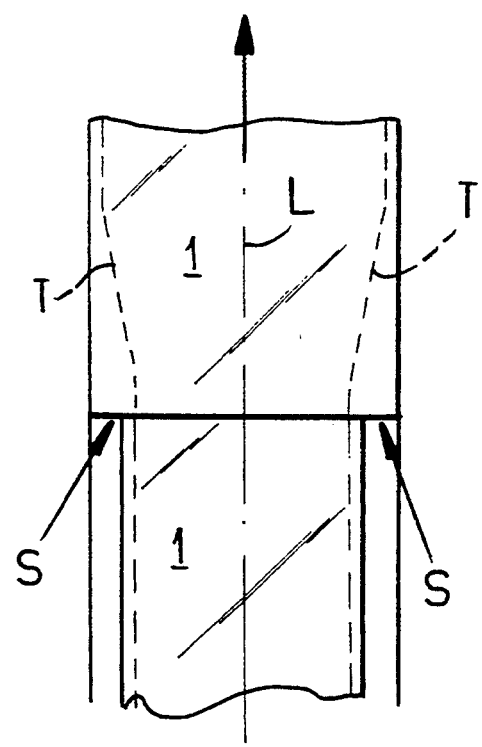
FIG.6　　　　　　FIG.7
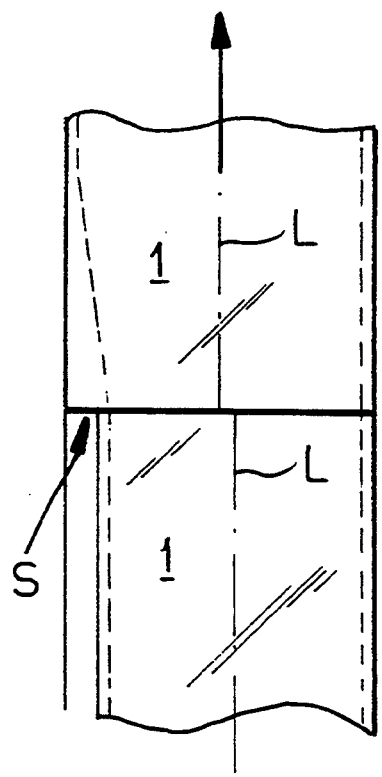
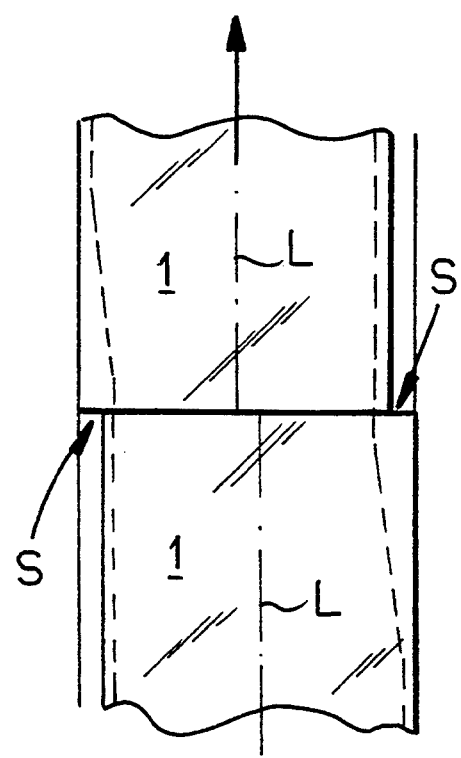
FIG.8　　　　　　FIG.9

SYSTEM FOR TRIMMING A CONTINUOUSLY MOVING METAL STRIP

FIELD OF THE INVENTION

The present invention relates to the production of metal strip. More particularly this invention concerns a system for trimming the edges of a metal strip as it is continuously produced.

BACKGROUND OF THE INVENTION

When metal strip is produced, for instance by hot rolling in a mill, the strip's edges are not perfectly straight and its width varies somewhat. Thus it is necessary to trim off the edges to make them straight and give the strip a uniform width. The standard setup for doing this uses two trimmer heads each comprising a pair of cutter wheels between which the strip is passed, thereby cutting a trim strip from each edge. The two heads are spaced apart by the desired strip width and equipment is provided to center the incoming strip between them, ensuring under normal circumstances that both of the strip edges will be cut off fairly uniformly to produce the desired straight and uniform strip. Each trimming head is further associated with a winding or catching device which traps the cut-off trim strip and conducts it away. This system works perfectly so long as the incoming strip is generally straight and its width does not vary excessively.

It is not uncommon during normal production for a strip to have substantial camber, that is to have edges that are parallel but not straight, or for a strip to have a region of substantially substandard width. Furthermore it is standard in continuously running operations, for example pickling, coating, or annealing, for the leading end of a new strip to be attached by welding to the trailing end of a strip being processed so that the new strip need not be painstakingly threaded through the equipment. In this latter case there is frequently a sudden change in strip width or a sudden lateral dislocation of the center of the strip. When this happens it is possible for one of the trimming heads to run off the strip which in itself is not harmful, but the trim strip produced by the head runs out and when the head comes back onto the workpiece a new trim strip is started that can get fouled in the downstream equipment or that at least will not be collected in the usual manner. Obviously this can lead to substantial down time while the equipment is adjusted and the mess is cleared.

OBJECTS OF THE INVENTION

It is therefore an object of the present invention to provide an improved system for trimming longitudinal edges of a continuously moving strip.

Another object is the provision of such an improved system for trimming longitudinal edges of a continuously moving strip which overcomes the above-given disadvantages, that is which can accurately follow changes in strip width and even non-straight strip edges.

SUMMARY OF THE INVENTION

According to the invention a strip is displaced longitudinally with its edges parallel to a stationary machine centerline at a predetermined travel speed through a monitoring station and through a trimming station spaced downstream from the monitoring station and equipped with a pair of transversely offset trimming heads. The transverse offset of the strip edges relative to the machine centerline is continuously monitored at the monitoring station and respective outputs corresponding to the transverse offsets between the respective edges and the machine centerline at the monitoring station are produced. The time the strip takes to travel from the monitoring station to the trimming station is calculated based on the strip travel speed and the longitudinal spacing between the stations. The trimming heads are transversely displaced in accordance with the calculated time and the respective transverse edge offset such that the heads remain in contact with the strip. Continuous edge portions are thus cut from the strip with the heads.

Normally sensors are provided at the monitoring station for monitoring the strip width and any sudden offsets in edge position as well as the absolute edge position. The corrections in trimmer position are made in real time, that is they are shifted so that, by the time a shifted edge has arrived at them, they are already in the proper position.

Control is effected in real time, but as long as the strip is substantially normal, trimming takes place as usual with the strip's centerline set on the machine centerline and the trimming heads symmetrically flanking the superposed centerlines and at a predetermined spacing. When a thick strip, that is one 3 mm to 6 mm thick, has a camber, the trimmers follow the curve, and when a thin strip, that is one 0.3 mm to 1.5 mm thick, is creased, it also follows the varying edge.

The instant invention is based on the recognition that it is better to keep the trimmer heads in contact with the strip, even when that means that the trimmed piece will be a useless reject, than to let this contact be lost so that production must be shut down while the trimmed-off strip is reengaged in its collecting equipment. Thus if a strip has a region of below-standard width, its edges will still be trimmed even though this part of the strip will have to be cut out and discarded.

The heads are normally maintained at a predetermined transverse spacing from each other corresponding to a desired minimum strip width In addition the monitoring station is positioned far enough upstream of the trimming station that, relative to the travel speed, the strip can be stopped before a detected irregularity arrives at the trimming station. The strip is held under longitudinal tension in the trimming station.

A huge advantage of the system of this invention is that it can adapt to suddenly varying strip widths, such as happen when a new strip of greater or smaller width is grafted onto the end of another strip. In this case, when the strip width changes dramatically, the trimming heads are transversely displaced before the location of dramatic width change, say 10 mm to 100 mm, arrives at the trimming station such that the trimming heads are positioned a desired spacing inward of the strip edges after the location of dramatic width change arrives at the trimming station. Similarly, when the strip centerline shifts transversely, both trimming heads are displaced transversely before the location of centerline shift arrives at the trimming station such that the trimming heads are positioned a desired spacing inward of the strip edges after the location of centerline shift arrives at the trimming station. Finally, when one edge of the strip shifts transversely outward by a distance greater than a throat depth of the respective trimming head, advance of the strip is stopped before the location of edge shift arrives at the respective trimming head. This prevents damage to the trimmers.

Real-time control of the system means that the program for handling the various inputs can anticipate what is needed, and can set the trimmer heads appropriately, so that they never run off the strip. Reaction time is reduced to nothing by real-time processing An apparatus for trimming longitudinal edges of an elongated strip has according to the invention means for displacing the strip longitudinally with its edges parallel to a stationary machine centerline at a predetermined travel speed through a monitoring station and through a trimming station spaced downstream from the monitoring station, means including edge-position sensors for continuously monitoring the transverse offset of the strip edges relative to the machine centerline at the monitoring station and producing respective outputs corresponding to the transverse offsets between the respective edges and the machine centerline at the monitoring station, and means including a movement sensor for continuously detecting the real-time instantaneous displacement speed of the strip. A controller connected to the position and movement sensors calculates the time the strip takes to travel from the monitoring station to the trimming station based on the strip travel speed and the longitudinal spacing between the stations. Trimming heads at the trimming station cut continuous edge portions from the strip with the heads, and actuators connected to the controller transversely displace the trimming heads in accordance with the calculated time and the respective transverse edge offset such that the heads remain in contact with the strip.

Upstream and downstream tensioners upstream and downstream of the trimming station hold the strip under tension in the trimming station. The edge sensors are between the tensioners. Furthermore, means is provided for stopping advance of the strip before a location on the strip where one edge of the strip shifts transversely outward by a distance greater than a throat depth of the respective trimming head arrives at the respective trimming head.

In accordance with further feature of the invention second edge-position sensors upstream of the first-mentioned edge sensors continuously monitor the transverse offset of the strip edges relative to the machine centerline at the monitoring station and produce respective outputs corresponding to the transverse offsets between the respective edges and the machine centerline at the monitoring station, and a second movement sensor upstream of the first-mentioned movement sensor continuously detects the real-time instantaneous displacement speed of the strip. The second sensors are connected to the control means. In this manner irregularities in the strip edge regions are detected early enough that the workpiece travel speed can if necessary be dropped to zero before a bad part reaches the trimming shear or any upstream lateral structure in order to be able to there be able to make any necessary side notches for moving in the trimmer heads.

BRIEF DESCRIPTION OF THE DRAWING

The above and other objects, features, and advantages will become more readily apparent from the following, reference being made to the accompanying drawing in which:

FIGS. 6, 7, 8, and 9 are top views of other strips illustrating how they are trimmed in accordance with the invention.

SPECIFIC DESCRIPTION

Figure 1:
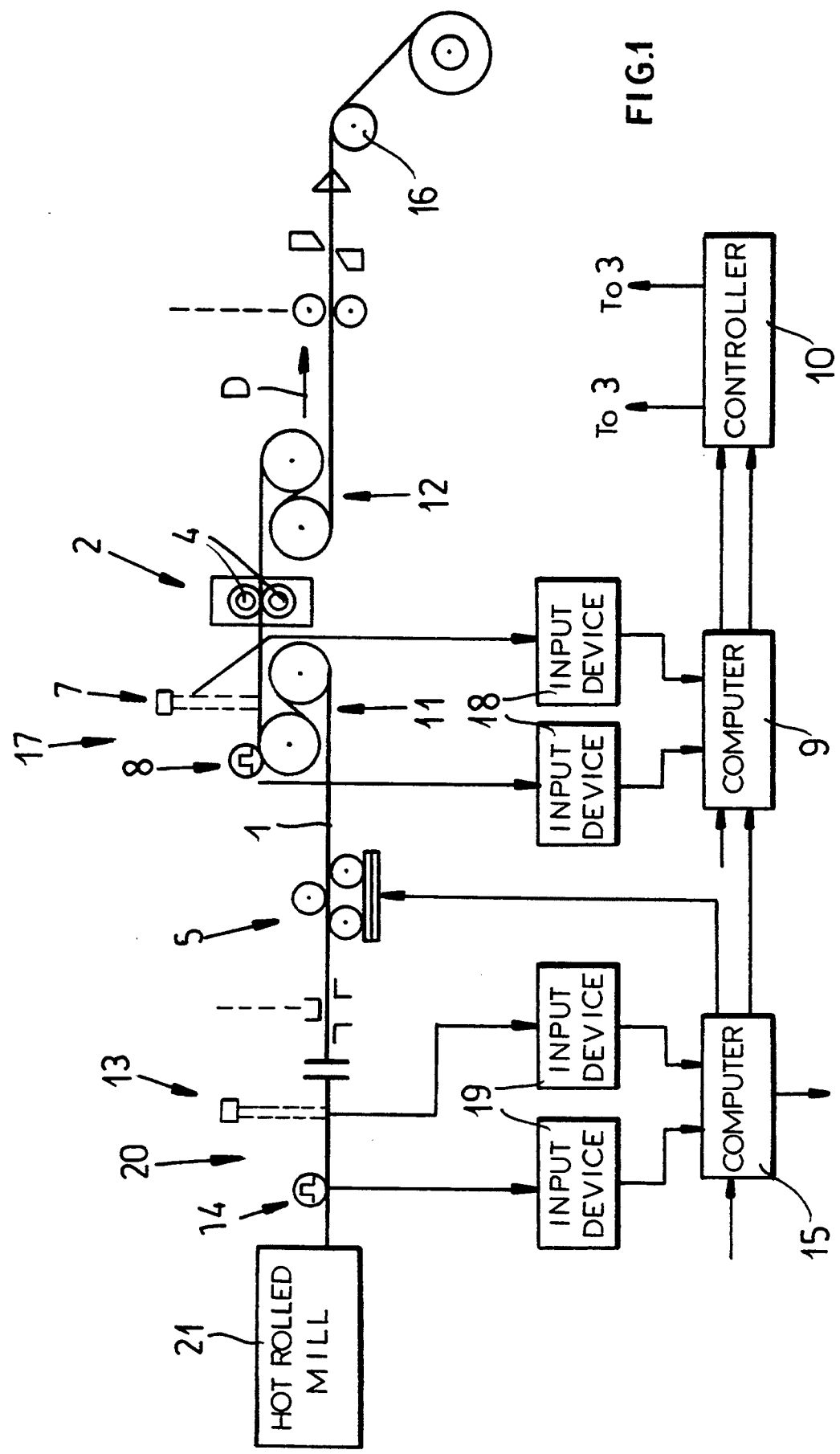
FIG. 1 is a mainly diagrammatic side view of the apparatus according to the invention.
Figure 2:
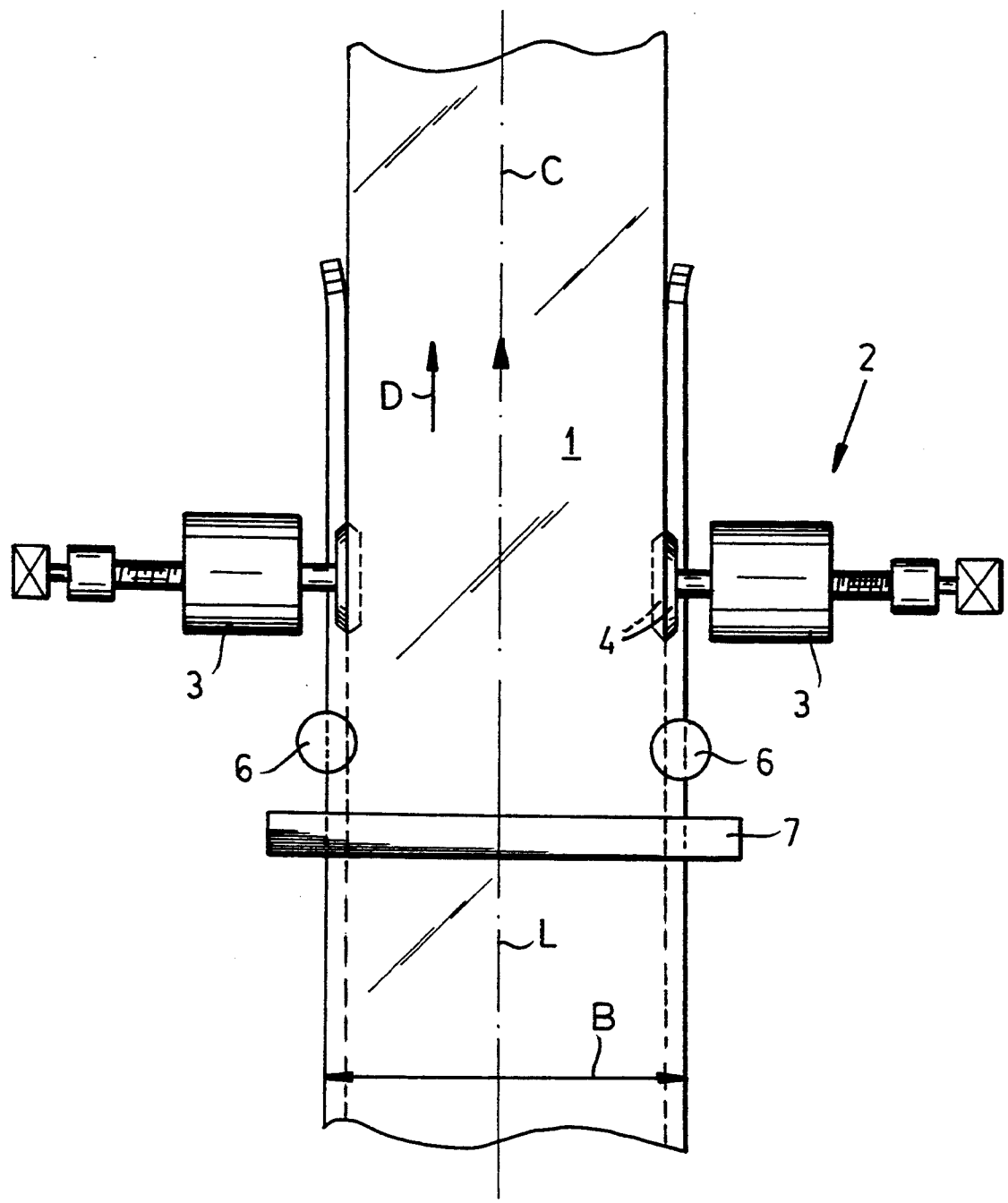
FIG. 2 is a top view of a part of the apparatus.

As seen in FIGS. 1 and 2 a hot-rolled steel strip 1 having a centerline L is advanced longitudinally in direction D parallel to the centerline L by a drive 16 at a normally constant travel speed. The strip 1 passes through a central trimming station 2 equipped with two trimming heads 4 each formed by a pair of circular blades and each having a respective actuator 3 for displacement transversely of the direction D and centerline L, and the machine itself has a centerline C which normally coincides with the workpiece centerline L. Roller sets 11 and 12 keep the strip 1 tight in the trimming station 2.

Slightly upstream in the direction D of the trimming station 2 is a monitoring station 17 equipped with a pair of optical edge-position detectors 6, a sensor 7 for measuring the width B of the strip 1, and a web-speed detector 8. The sensors 7 and 8 are connected via respective input devices 18 to a processor 9 which calculates how much material must be trimmed off the strip edges to produce a desired finished workpiece width. This processor/computer 9 is connected to a control unit 10 which in turn is connected to the head positioners 3 to move the two heads 4 independently of each other to trim the strip 1 as described below.

Upstream of the first width and movement sensors 7 and 8 in a second monitoring station 20 is a second sensor 13 for monitoring irregularities in both longitudinal edges of the strip 1 and a second movement sensor 14. Both sensors 13 and 14 are connected via respective input devices 19 with a computer 15 in turn connected to the computer 9. In addition a set of rollers 5 upstream of the station 17 and downstream of the station 20 serves to keep the centerline L of the workpiece 1 aligned with the machine centerline C in the manner well known in the art. These rollers 5 may be tipped independently of each other by an actuator operated by the computer 15 so that the workpiece 1 leaves them with its centerline L offset laterally from the position it has on entering..

Figure 3:
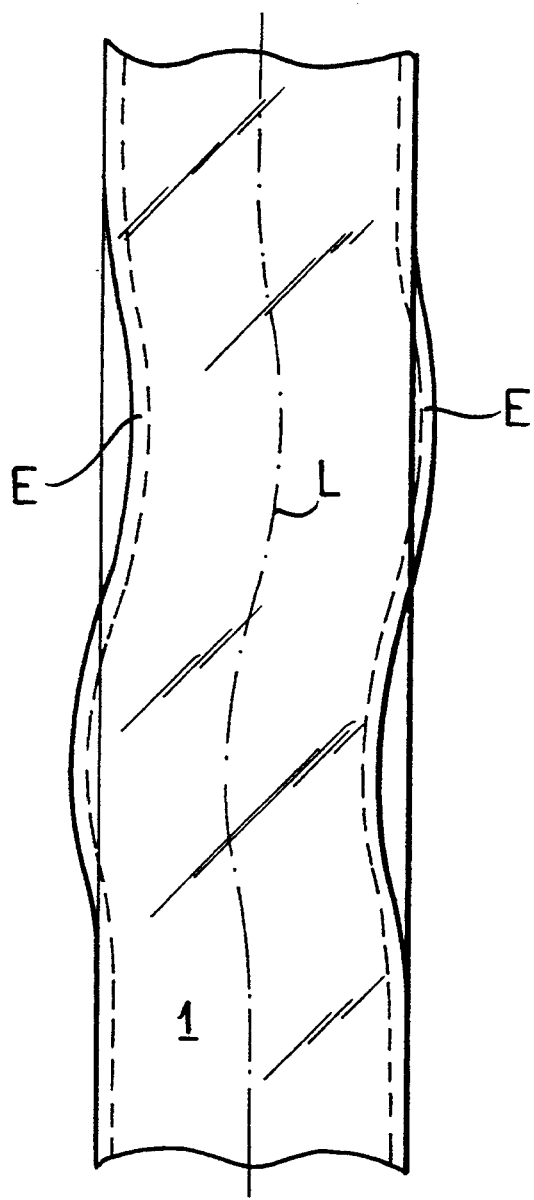
FIGS. 3 and 4 are top views of strips trimmable with the apparatus of this invention.
Figure 4:
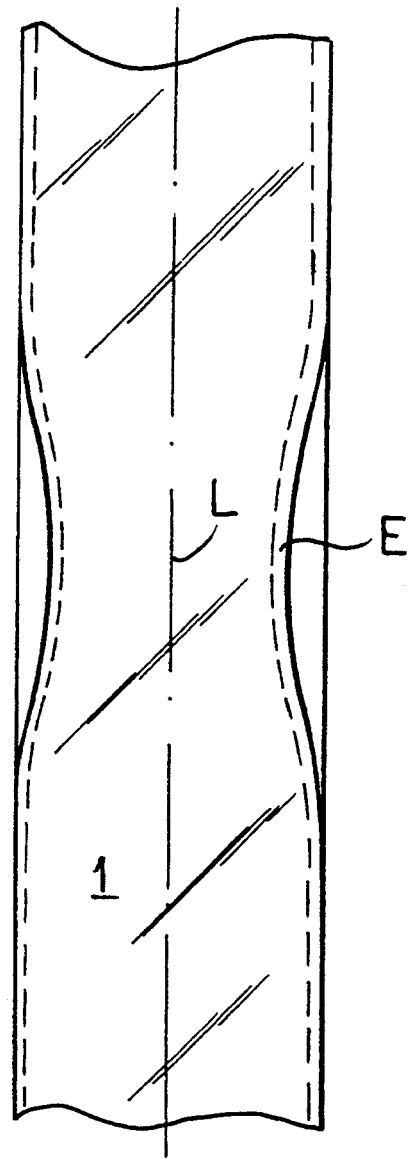
Figure 5:
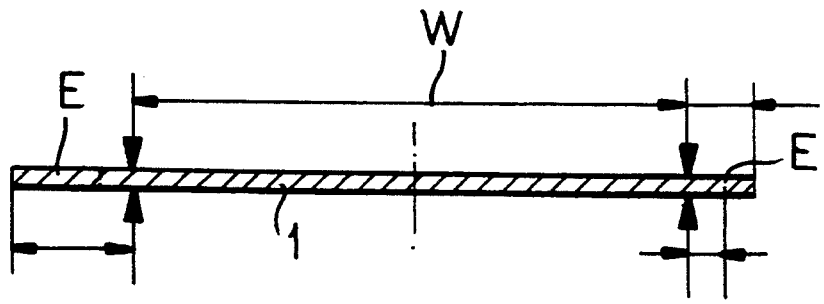
FIG. 5 is a cross section through a strip.

The instant invention can be used to trim strips E off the edges of a cambered workpiece 1 such as shown in FIG. 3, or even off a workpiece 1 whose edges both move in at a restricted region as shown in FIG. 4. The strips E may be wide or narrow as shown respectively on the left and right in FIG. 5, and normally the desired workpiece width W is maintained down the center. Of course as mentioned above, when necessary the workpiece 1 will be trimmed too narrow, so long as the edge strip E is maintained continuous as it has been found preferable to create a workpiece reject than to have to shut down the production line.

FIG. 6 shows how the workpiece 1 can be laterally notched out between succeeding strips joined at a join line J, as in the prior art. Alternately as seen in FIG. 7 when no such notching is used the heads 3 are moved in along a trim line T to be spaced inward before the narrow following strip arrives at them, cutting off the step S formed between the strips. In FIG. 8 the centerlines L of the workpieces 1 are offset laterally from each other so that one edge is aligned but the other has a step S, and in FIG. 9 both edges are offset with two steps S.

The controller 15 is also capable of shutting down the entire system when it determines that an edge strip E is too wide to fit in the throat of the respective trimming head 4.

I claim:

1. A method of trimming longitudinal edges of an elongated endless strip continuously arriving from a treatment apparatus, the method comprising the steps of:

continuously displacing the strip longitudinally with its edges substantially parallel to a stationary machine centerline at a predetermined travel speed through a monitoring station and through a trimming station spaced downstream from the monitoring station and equipped with a pair of transversely offset trimming heads;

continuously monitoring the transverse offset of the strip edges relative to the machine centerline at the monitoring station and producing respective outputs corresponding to the transverse offsets between the respective edges and the machine centerline at the monitoring station;

calculating the time the strip takes to travel from the monitoring station to the trimming station based on the strip travel speed and the longitudinal spacing between the stations;

maintaining the heads at a predetermined transverse spacing from each other corresponding to a desired minimum strip width except when one of the outputs indicates that the respective strip edge is offset inward on the strip beyond a predetermined limit;

when one of the outputs indicates that the respective strip edges is offset inward on the strip beyond a predetermined limit, transversely displacing the respective the trimming head inward independently of the other trimming head at a speed directly proportional to the workpiece travel speed with real-time control in accordance with the calculated time and the respective transverse edge offset such that the respective head remains in contact with the strip and the strip is trimmed to a width that is less than the minimum strip width; and cutting continuous edge portions from the strip with the heads.

2. The method defined in claim 1 wherein the monitoring station is positioned far enough upstream of the trimming station that, relative to the travel speed, the strip can be stopped before a detected irregularity arrives at the trimming station.

3. The method defined in claim 1, further comprising the step of maintaining the strip under longitudinal tension in the trimming station.

4. The method defined in claim 1, further comprising the step, when the strip centerline shifts transversely, of transversely displacing both trimming heads before the location of centerline shift arrives at the trimming station such that the trimming heads are positioned a desired spacing inward of the strip edges after the location of centerline shift arrives at the trimming station.

5. The method defined in claim 1, further comprising the step, when one edge of the strip shifts transversely outward by a distance greater than a throat depth of the respective trimming head, of stopping advance of the strip before the location of edge shift arrives at the respective trimming head.

6. An apparatus for trimming longitudinal edges of an elongated strip continuously arriving from a treatment apparatus, the apparatus comprising:

means for continuously displacing the strip longitudinally with its edges substantially parallel to a stationary machine centerline at a predetermined travel speed through a monitoring station and through a trimming station spaced downstream from the monitoring station;

means including edge-position sensors for continuously monitoring the transverse offset of the strip edges relative to the machine centerline at the monitoring station and producing respective outputs corresponding to the transverse offsets between the respective edges and the machine centerline at the monitoring station;

means including a movement sensor for continuously detecting the real-time instantaneous displacement speed of the strip;

control means connected to the position and movement sensors for calculating the time the strip takes to travel from the monitoring station to the trimming station based on the strip travel speed and the longitudinal spacing between the stations;

means including trimming heads at the trimming station for cutting continuous edge portions from the strip with the heads;

means for maintaining the heads at a predetermined transverse spacing from each other corresponding to a desired minimum strip width except when one of the outputs indicates that the respective strip edge is offset inward on the strip beyond a predetermined limit; and means including actuators connected to the control means for, when one of the outputs indicates that the respective strip edge is offset inward on the strip beyond a predetermined limit, transversely displacing the respective trimming head independently of the other bead in accordance with the calculated time and the respective transverse edge offset such that the respective head remains in contact with the strip and the strip is trimmed to a width that is less than the minimum strip width.

7. The edge-trimming apparatus defined in claim 6, further comprising upstream and downstream tensioning means upstream and downstream of the trimming station for holding the strip under tension in the trimming station.

8. The edge-trimming apparatus defined in claim 7 wherein the edge sensors are between the tensioning means.

9. The edge-trimming apparatus defined in claim 6, further comprising means for stopping advance of the strip before a location on the strip where one edge of the strip shifts transversely outward by a distance greater than a throat depth of the respective trimming head arrives at the respective trimming head.

10. The edge-trimming apparatus defined in claim 6, further comprising:

means including second edge-position sensors upstream of the first-mentioned edge sensors for continuously monitoring the transverse offset of the strip edges relative to the machine centerline at the monitoring station and producing respective outputs corresponding to the transverse offsets between the respective edges and the machine centerline at the monitoring station; and means including a second movement sensor upstream of the first-mentioned movement sensor for continuously detecting the real-time instantaneous displacement speed of the strip, the second sensors being connected to the control means.

* * * * *